United States Patent Office 3,540,277
Patented Nov. 17, 1970

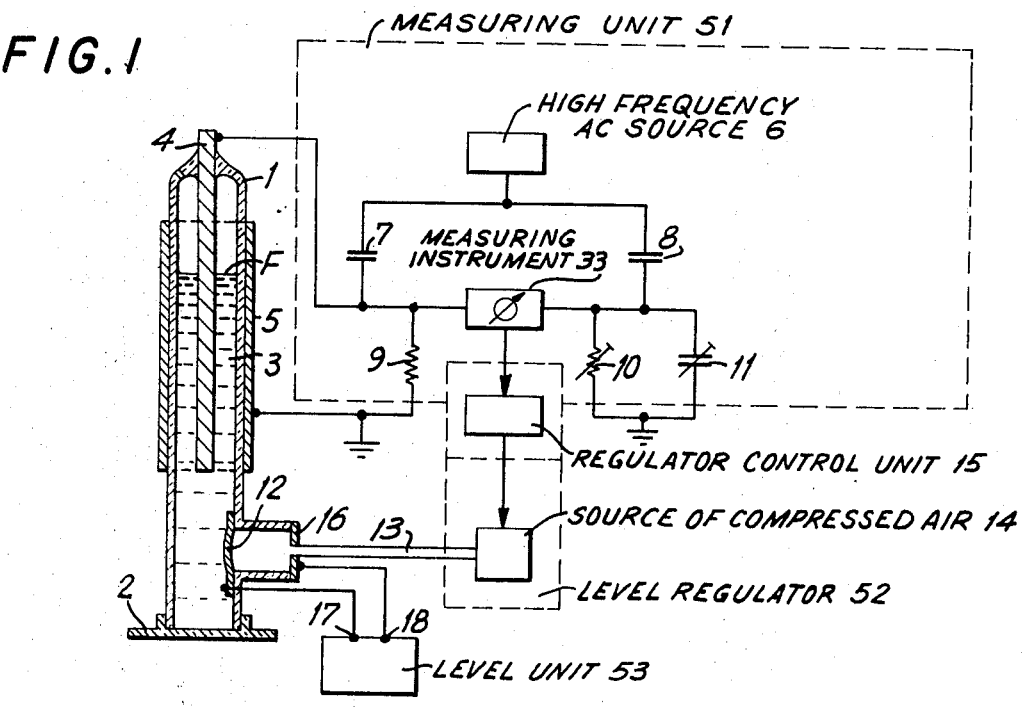
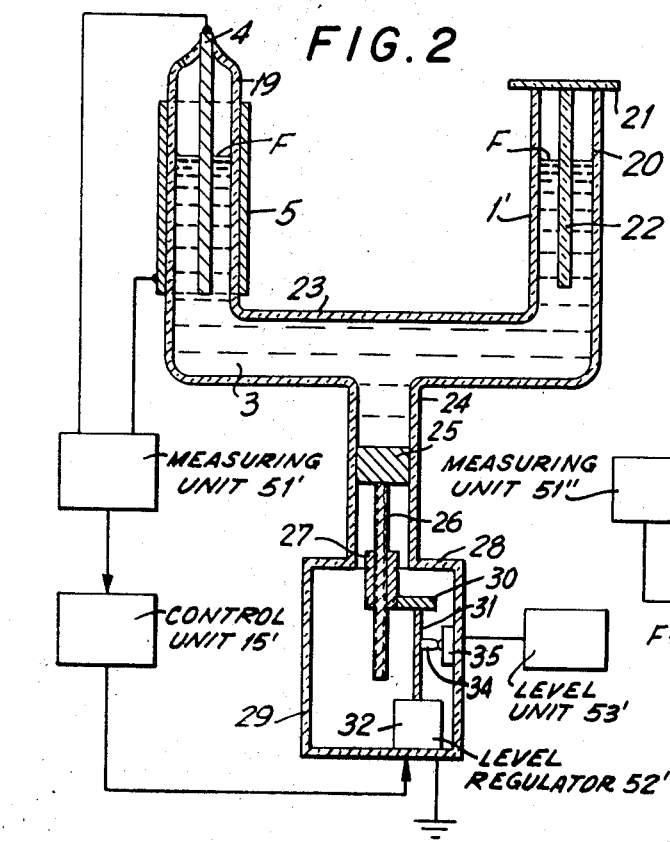
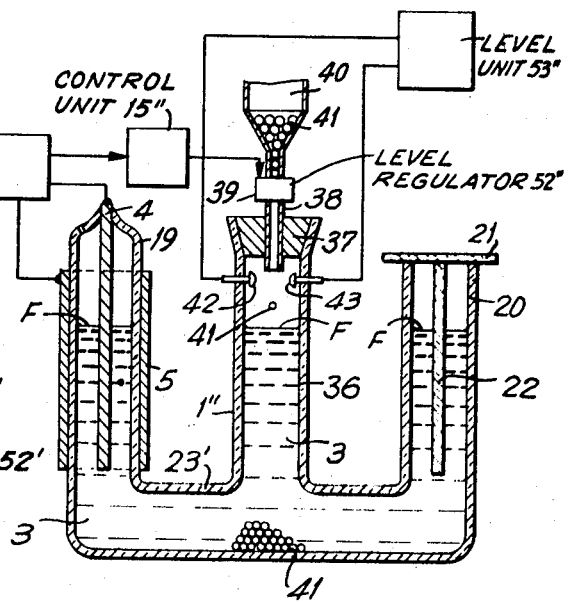

1

3,540,277
EVAPORIMETER UTILIZING VARIATION IN
CAPACITANCE TO INDICATE LIQUID LEVEL
Hermann Roth and Heinz Walz, Erlangen, Germany,
assignors to Siemens Aktiengesellschaft, Berlin and
Munich, Germany, a corporation of Germany
Filed Dec. 24, 1968, Ser. No. 786,584
Claims priority, application Germany, Dec. 29, 1967,
1,648,305
Int. Cl. G01f 23/26
U.S. Cl. 73—335          10 Claims

ABSTRACT OF THE DISCLOSURE

A level regulator cooperates with a tube having liquid therein and an area through which the liquid evaporates to raise the level of liquid between and functioning as a dielectric for a pair of spaced plate members to compensate for a decrease in level due to evaporation. The capacitance of the plate members varies as the evaporation of the liquid and is measured by a measuring unit. A control unit electrically connected between the measuring unit and the level regulator controls the level regulator to compensate for variation of level as indicated by variation of the capacitance of the plate members.

DESCRIPTION OF THE INVENTION

The present invention relates to an evaporimeter. More particularly, the invention relates to an evaporimeter utilizing a variation in capacitance to indicate a liquid level.

Measuring the evaporated amount of water is important in a properly operating or exact air conditioning system. The measurement of water evaporation is also of particular interest in botanical or zoological research. In meteorology, too, it is often necessary to have an exact determination of the rate of evaporation.

Evaporimeters are known wherein water is provided in a vertically positioned tube, sealed or closed on top. The bottom opening of the tube is closed with a plate of water absorbent material, such as paper, wherefrom the water in the tube evaporates. The evaporated amount of water may be determined directly from the water level. The disadvantages of this simple type of evaporimeter are due to the fact that the measurement may be only inaccurately determined and automatic control or registration is not provided. Moreover, difficulties occur during the supplying of water to the evaporimeter. Furthermore, direct measurement of the differential evaporation rate, that is, the amount of evaporation per unit time, is impossible in the aforedescribed evaporimeter.

The principal object of the present invention is to provide a new and improved evaporimeter.

An object of the present invention is to provide an evaporimeter which overcomes the disadvantages of evaporimeters of known type.

An object of the present invention is to provide an evaporimeter which accurately indicates the differential amount of evaporation or vaporization.

An object of the present invention is to provide an evaporimeter which provides an exactly accurate indication of the amount of evaporation from the measurement of a capacitance utilizing the evaporating liquid as a dielectric.

An object of the present invention is to provide an evaporimeter which functions with accuracy, effectiveness, efficiency and reliability.

In accordance with the present invention, an evaporimeter comprises a sealed tube having a lquid therein and an area through which the liquid evaporates. A first plate member is positioned in the liquid in the tube. A second plate member is spaced from the first plate member. The liquid is disposed between the first and second plate members as dielectric and has a level between the plate members which decreases as evaporation of the liquid increases thereby varying the capacitance of the plate members as evaporation of the liquid varies. A level regulator cooperates with the tube to raise the liquid level to compensate for a decrease thereof due to evaporation of the liquid. A measuring unit electrically connected to the first and second plate members measures the capacitance of the plate members. A control unit electrically connected between the measuring unit and the level regulator controls the level regulating means to compensate for variation of liquid level as indicated by variation of the capacitance of the plate members.

In a first embodiment of the invention, the level regulator comprises a membrane in the tube below the liquid level and means for applying pneumatic pressure to the membrane comprising a source of compressed air coupled to the membrane and electrically connected to the control unit for applying air pressure to the membrane in accordance with the capacitance of the plate members as indicated by the measuring unit.

In a second embodiment of the invention, the level regulator comprises a movably mounted piston in the tube below the liquid level and a piston drive coupled to the piston and electrically connected to the control unit for moving the piston in accordance with the capacitance of the plate members as indicated by the measuring unit.

In a third embodiment of the invention, the level regulator comprises solid body means positioned in the tube above the liquid level and electrically connected to the control unit for dropping solid bodies into the liquid in accordance with the capacitance of the plate members as indicated by the measuring unit.

In the first embodiment of the invention, level means is connected to the level regulator for indicating the liquid level by indicating the deflection of the membrane thereof. The level means comprises a plate member in operative proximity with the membrane and additional measuring means electrically connected to the plate member and to the membrane for measuring the capacitance of the plate member and the membrane.

In the second embodiment of the invention, level means is coupled to the piston for indicating the liquid level by indicating the displacement of the piston. The level means comprises a microswitch and projecting means on the piston for actuating the microswtich thereby indicating the position of the piston. The piston includes a threaded member and a piston head mounted at one end of the threaded member. The piston drive comprises an electric motor coupled to the threaded member and electrically connected to the control unit.

In the third embodiment of the invention, the solid bodies dropped into the liquid are substantially identical miniature balls. Level means is positioned in the tube for indicating the liquid level by indicating the number of solid bodies dropped into the liquid. The level means comprises a light source for producing a light beam through which solid bodies dropping into the liquid pass and photosensitive means in operative proximity with the light source for receiving the light beam.

In order that the present invention may be readily carried into effect, it will now be described with reference to the accompanying drawing, wherein:

FIG. 1 is a schematic diagram, in section, block diagram and circuit diagram of an embodiment of the evaporimeter of the present invention;

FIG. 2 is a schematic diagram, in section, and a block diagram of another embodiment of the evaporimeter of the present invention; and FIG. 3 is a schematic diagram, in section, and a block diagram of still another embodiment of the evaporimeter of the present invention.

In the figures, the same components are identified by the same reference numerals.

In FIG. 1, a plate 2 of liquid absorbent material closes the bottom open end of a vertically positioned sealed tube 1. The tube 1 contains a liquid 3. A first capacitor plate member or electrode 4 in the shape of a rod is positioned in the liquid in the tube 1. The tube 1 is enclosed by a second capacitor plate member or electrode 5 of annular or open cylindrical configuration. The second plate member 5 may comprise a metallic coating on the inside or outside surface of the wall of the tube 1.

The second plate member 5 may be positioned inside the tube 1, and may comprise a metal jacket or a metal coating. At least one of the first and second electrodes 4 and 5 must then be coated with a layer of electrical insulating material in order to avoid direct current conduction in the liquid 3. The layer of insulation should be very thin in order to prevent losses to a maximum extent.

The liquid 3 may be water and is interposed between the first and second plate members 4 and 5 as the dielectric of the capacitor 3, 4, 5. The capacitance of the capacitor 3, 4, 5 varies in accordance with the level F of the liquid 3 and said level is a direct indication or measure of the rate of evaporation or vaporization.

The cylindrical capacitor 3, 4, 5 is connected in a branch of an AC measuring bridge network at a measuring unit 51. The bridge network comprises a capacitor 7, a capacitor 8, a variable capacitor 11, a damping resistor 9 connected in parallel with the cylindrical capacitor 3, 4, 5 and a variable damping resistor 10 connected in parallel with the cylindrical capacitor 3, 4, 5 and with the capacitor 11. The bridge balance is determined by a measuring instrument 33 which may include an amplifier. The AC bridge network is energized by a high frequency AC source or generator 6 having a frequency of 100 kHz. The indication of the measuring instrument 33 corresponds to the capacitance of the capacitor 3, 4, 5. Any suitable measuring means for measuring the capacitance of the capacitor 3, 4, 5 may be utilized instead of the bridge network.

The liquid level F of the liquid in the tube 1 must be kept constant to permit measurement of the differential evaporation rate of said liquid when the volume of the liquid space varies. In the embodiment of FIG. 1, a membrane 12 functions with a source of compressed air 14 as a level regulating device or level regulator 52 which cooperates with the tube 1 to raise the liquid level to compensate for a decrease thereof due to evaporation of the liquid 3. The membrane 12 is provided in the wall of the tube 1 below the liquid level and is expanded into said tube pneumatically by compressed air from the source 14 of compressed air via a pressure conduit or compressed air line 13.

When the liquid 3 evaporates from inside tube 1, the membrane 12 is urged or expanded into the space occupied by said liquid in said tube by the compressed air. This causes the liquid level F of the liquid 3 to rise or increase. The compressed air source 14 of the level regulator 52 is controlled by a regulator control unit 15 which is electrically connected between the measuring unit 51 and the level regulator 52. The control unit 15 functions to control the level regulator 52 to compensate for variation of the liquid level F as indicated by variation of the capacitance of the capacitor 3, 4, 5. That is, the variation of capacitance of the capacitor 3, 4, 5, determined by the measuring instrument 33 indicates the variation of the liquid level F and is utilized by the control unit 15 to control the operation of the compressed air source 14 to provide corresponding air pressure to the membrane 12 to compensate for a decrease in said liquid level.

The deflection of the membrane 12 may be measured or indicated by any suitable level unit 53, which measures membrane deflection such as, for example, a unit utilized with a membrane manometer. This permits the reduction of the liquid volume to be directly measured, and the measured values so obtained, constitute a measure or indication of the differential rate of evaporation, if appropriate calibration of the measuring instrument is provided. It is especially preferred to determine the deflection of the membrane 12 from a capacitance measurement. An appropriate device is schematically illustrated in FIG. 1. The membrane 12 and the plate 16, in operative proximity with said membrane, function as the plate members or electrodes of the measuring capacitor.

The measuring capacitor is connected, via terminals 17 and 18, to the level unit 53 which measures the capacitance of the capacitor 12, 16. The level unit 53 may comprise any suitable capacitance measuring means such as, for example, a second AC bridge network, energized by an high frequency AC source, as utilized in the measuring unit 51. The special advantage afforded by this electrical measuring method is in the simplicity with which the obtained measured data may be automatically recorded.

The embodiment of FIG. 2 of the evaporimeter of the present invention comprises a tube 1' having two upwardly extending vertical branches 19 and 20 and a downwardly extending vertical branch 24, all extending from a horizontally extending branch 23. The branch 19 of the tube 1' is provided with the capacitor plate members 4 and 5 and the tube 1' contains the liquid 3, as in the embodiment of FIG. 1. The open upper end of the branch 20 is closed by a plate 21 of liquid absorbent material having a stem 22 extending therefrom into the liquid 3. The plate 21 and stem 22 may comprise, for example, a porous ceramic which is available for purchase under the name "Ergan."

The plate 21 has a larger cross-section than the branch 20, in order to obtain the largest possible evaporation surface. The embodiment of FIG. 2 may be constructed in an especially simple manner and only the plate 21 need be removed for supplying the liquid 3, thereby.

A piston 25 is movably mounted in the branch 24 for movement upward and downward in said branch. The piston 25 is moved or driven via a finely threaded spindle 26 which is threadedly coupled in an internally threaded socket 27. The socket 27 may be pivotally mounted at the mouth of a housing 29 via a ball bearing, for example. The socket 27 is externally threaded along part of its outer cylindrical surface and the external threading is threadedly coupled with a gear or toothed wheel 30. The gear wheel 30 is affixed to and rotates with a shaft 31 which is coupled to and driven by a motor 32. The piston 25 may be driven by more complicated drives which may produce any desired transmission ratios.

The rotation of the socket 27, which results in an upward or downward displacement of the piston 25 may be determined or sensed by one or several levers or arms 34 which are affixed to the shaft 31 and extend therefrom and which actuate a microswitch 35. The electrical pulses produced by the microswitch 35 are a direct measurement or indication of the displacement of the piston 25. Therefore, at a constantly maintained liquid level F, such electrical pulses are a direct measurement or indication of the differential evaporation rate. The motor 32, the piston 25 and the couplings 26, 27, 31 function as the level regulator 52'.

The motor 32 or level regulator 52' cooperates with the tube 1' to raise the liquid level F to compensate for a decrease thereof due to evaporation of the liquid 3 by moving the piston 25 upward. The control unit 15', electrically connected between the measuring unit 51' and the level regulator 52', controls said level regulator to compensate for variation of the liquid level F as indicated by variation of the capacitance of the capacitor 3, 4, 5 of FIG. 2 in the same manner as in FIG. 1. That is, the variation of capacitance of the capacitor 3, 4, 5 determined by the measuring instrument of the measuring unit 51' indicates the variation of the liquid level F and is utilized by the control unit 15' to control the operation of the motor 32 to provide a corresponding upward movement of the piston 25 to compensate for a decrease in said liquid level.

The movement of the piston 25 may be measured or indicated by any suitable level unit 53', which measures the distance moved by the piston such as, for example, a counter unit actuated by microswitch. This permits the reduction of the liquid volume to be directly measured, and the measured values so obtained, constitute a measure or indication of the differential rate of evaporation.

The embodiment of FIG. 3 of the evaporimeter of the present invention comprises a tube 1" having three upwardly extending vertical branches 19, 20 and 36, all extending from a horizontally extending branch 23'. The branches 19 and 20 and their components 3, 4 and 5 and 21 and 22 are the same as the corresponding branches and components of FIG. 2. The branch 36 is sealed by a plug or stopper 37 provided with an open tube 38.

A receptacle 40 having a plurality of identical balls 41 opens into the tube 38 at the top of said tube. A level regulator 52" comprising an electromagnetically controlled valve 39 is interposed in the tube 38. The valve 39 or level regulator 52" cooperates with the tube 1" to raise the liquid level F to compensate for a decrease thereof due to evaporation of the liquid 3 by opening and thereby passing a ball 41 into said liquid via the tube 1" and the branch 36. The control unit 15", electrically connected between the measuring unit 51" and the level regulator 52", controls said level regulator to compensate for variation of the liquid level F as indicated by variation of the capacitance of the capacitor 3, 4, 5 of FIG. 3 in the same manner as in FIGS. 1 and 2. That is, the variation of capacitance of the capacitor 3, 4, 5 determined by the measuring instrument of the measuring unit 51" indicates the variation of the liquid level F and is utilized by the control unit 15" to control the operation of the valve 39 to permit the passage of balls 41 to compensate for the decrease in said liquid level, thereby maintaining said liquid level constant.

The number of balls 41 passing into the liquid 3 may be measured or indicated by any suitable level unit 53", which indicates each of said balls as it passes out of the tube 38. The level unit 53" may comprise, for example, a light source 43 for producing a light beam through which the balls 41 dropping into the liquid 3 pass and a photocell 42 in operative proximity with said light source for receiving said light beam. The photocell 42 is connected to a counter unit actuated thereby each time the light beam is interrupted. The level unit 53" includes energizing means for the light source 43 and the photocell 42, as well as the counter and suitable connecting circuitry. The level unit 53" thus provides a direct measurement or indication of the number of balls 41 dropped into the liquid 3 and this is a direct measure or indication of the differential rate of evaporation.

While the invention has been described by means of specific examples and in specific embodiments, we do not wish to be limited thereto, for obvious modifications will occur to those skilled in the art without departing from the spirit and scope of the invention.

We claim:

1. An evaporimeter comprising
   a sealed tube having a liquid therein and an area through which said liquid evaporates;
   a first plate member in the liquid in said tube;
   a second plate member spaced from said first plate member, said liquid being disposed between said first and second plate members as dielectric and having a level between said plate members which decreases as evaporation of said liquid increases thereby varying the capacitance of said plate members as evaporation of said liquid varies;
   level regulating means cooperating with said tube to raise the liquid level to compensate for a decrease thereof due to evaporation of said liquid, said level regulating means comprising a membrane in said tube below the liquid level and means for applying pneumatic pressure to said membrane;
   measuring means electrically connected to said first and second plate members for measuring the capacitance of said plate members; and
   control means electrically connected between said measuring means and said level regulating means for controlling said level regulating means to compensate for variation of liquid level as indicated by variation of the capacitance of said plate members.

2. An evaporimeter comprising
   a sealed tube having a liquid therein and an area through which said liquid evaporates;
   a first plate member in the liquid in said tube;
   a second plate member spaced from said first plate member, said liquid being disposed between said first and second plate members as dielectric and having a level between said plate members which decreases as evaporation of said liquid increases thereby varying the capacitance of said plate members as evaporation of said liquid varies;
   level regulating means cooperating with said tube to raise the liquid level to compensate for a decrease thereof due to evaporation of said liquid;
   measuring means electrically connected to said first and second plate members for measuring the capacitance of said plate members; and
   control means electrically connected between said measuring means and said level regulating means for controlling said level regulating means to compensate for variation of liquid level as indicated by variation of the capacitance of said plate members, said level regulating means comprising a membrane in said tube below the liquid level and a source of compressed air coupled to said membrane and electrically connected to said control means for applying air pressure to said membrane in accordance with the capacitance of said plate members as indicated by said measuring means.

3. An evaporimeter as claimed in claim 2, further comprising level means connected to said level regulating means for indicating the liquid level by indicating the deflection of the membrane thereof.

4. An evaporimeter as claimed in claim 2, further comprising level means connected to said level regulating means for indicating the liquid level by indicating the deflection of the membrane thereof, said level means comprising a plate member in operative proximity with said membrane and additional measuring means electrically connected to said plate member and to said membrane for measuring the capacitance of said plate member and said membrane.

5. An evaporimeter comprising
   a tube having a liquid therein and an area through which said liquid evaporates;
   a first plate member in the liquid in said tube;
   a second plate member spaced from said first plate member, said liquid being disposed between said first and second plate members as dielectric and having a level between said plate members which decreases as evaporation of said liquid increases thereby varying the capacitance of said plate members as evaporation of said liquid varies;
   level regulating means cooperating with said tube to raise the liquid level to compensate for a decrease thereof due to evaporation of said liquid, said level regulating means comprising solid body means for dropping solid bodies into said liquid;

measuring means electrically connected to said first and second plate members for measuring the capacitance of said plate members; and control means electrically connected between said measuring means and said level regulating means for controlling said level regulating means to compensate for variation of liquid level as indicated by variation of the capacitance of said plate members.

6. An evaporimeter as claimed in claim 5, wherein the solid bodies dropped into the liquid are substantially identical miniature balls.

7. An evaporimeter comprising a tube having a liquid therein and an area through which said liquid evaporates;

a first plate member in the liquid in said tube;

a second plate member spaced from said first plate member, said liquid being disposed between said first and second plate members as dielectric and having a level between said plate members which decreases as evaporation of said liquid increases thereby varying the capacitance of said plate members as evaporation of said liquid varies;

level regulating means cooperating with said tube to raise the liquid level to compensate for a decrease thereof due to evaporation of said liquid;

measuring means electrically connected to said first and second plate members for measuring the capacitance of said plate members; and control means electrically connected between said measuring means and said level regulating means for controlling said level regulating means to compensate for variation of liquid level as indicated by variation of the capacitance of said plate members, said level regulating means comprising solid body means positioned in said tube above the liquid level and electrically connected to said control means for dropping solid bodies into said liquid in accordance with the capacitance of said plate members as indicated by said measuring means.

8. An evaporimeter as claimed in claim 7, further comprising level means positioned in said tube for indicating the liquid level by indicating the number of solid bodies dropped into said liquid.

9. An evaporimeter as claimed in claim 8, wherein said level means comprises a light source for producing a light beam through which solid bodies dropping into said liquid pass and photosensitive means in operative proximity with said light source for receiving said light beam.

10. An evaporimeter comprising a tube having a liquid therein and an area through which said liquid evaporates;

a first plate member in the liquid in said tube;

a second plate member spaced from said first plate member, said liquid being disposed between said first and second plate members as dielectric and having a level between said plate members which decreases as evaporation of said liquid increases thereby varying the capacitance of said plate members as evaporation of said liquid varies;

level regulating means cooperating with said tube to raise the liquid level to compensate for a decrease thereof due to evaporation of said liquid;

measuring means electrically connected to said first and second plate members for measuring the capacitance of said plate members;

control means electrically connected between said measuring means and said level regulating means for controlling said level regulating means to compensate for variation of liquid level as indicated by variation of the capacitance of said plate members, said level regulating means comprising movably mounted piston means in said tube below the liquid level and piston driving means coupled to said piston means and electrically connected to said control means for moving said piston means in accordance with the capacitance of said plate members as indicated by said measuring means; and level means coupled to said piston means for indicating the displacement of said piston means, said level means comprising microswitch means and projecting means on said piston means for actuating said microswitch means thereby indicating the position of said piston means.

References Cited

UNITED STATES PATENTS

| 1,625,420 | 4/1927 | Patterson | 73—335 |
| 2,354,964 | 8/1944 | Ostermann | 73—304 |
| 2,704,342 | 3/1955 | Fielden | 73—304 |

LOUIS R. PRINCE, Primary Examiner

DENIS E. CORR, Assistant Examiner

U.S. Cl. X.R.

73—304

F-3988

PO-1050 (5/69)

UNITED STATES PATENT OFFICE
CERTIFICATE OF CORRECTION

Patent No. 3,540,277  Dated November 17, 1970

Inventor(s) HERMANN ROTH ET AL

It is certified that error appears in the above-identified patent and that said Letters Patent are hereby corrected as shown below:

In the heading the German priority number should read as follows: --P 16 48 305.9--.

SIGNED AND SEALED
MAR 2 1971

(SEAL)
Attest:

Edward M. Fletcher, Jr.
Attesting Officer

WILLIAM E. SCHUYLER, JR
Commissioner of Patents